Aug. 30, 1938. B. JORGENSEN 2,128,301
METHOD OF ASSEMBLING SHOE UPPERS AND COUNTERS
Original Filed March 11, 1937
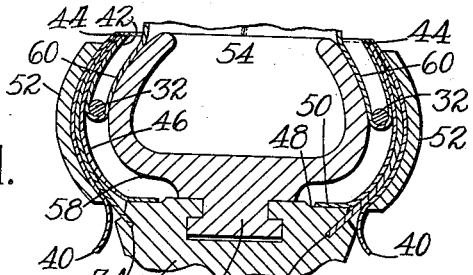
Fig.1.
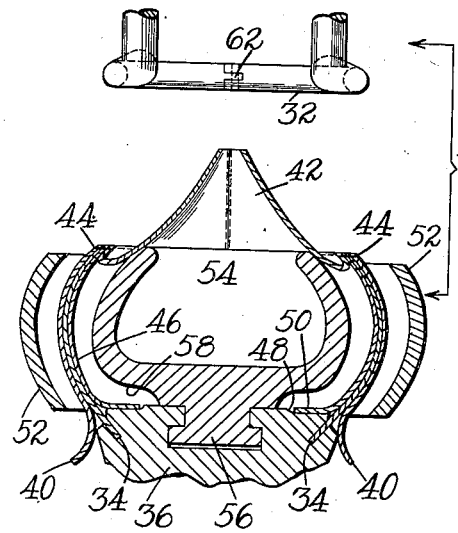
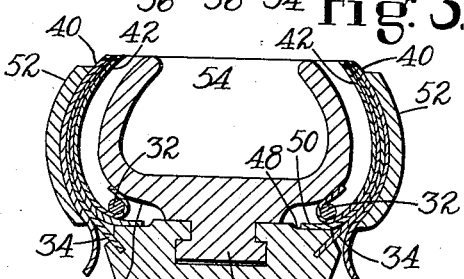
Fig.3.
Fig.4.
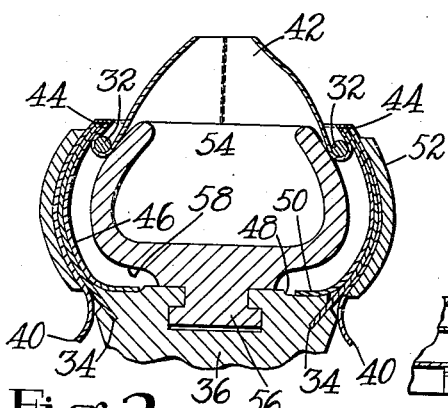
Fig.2.
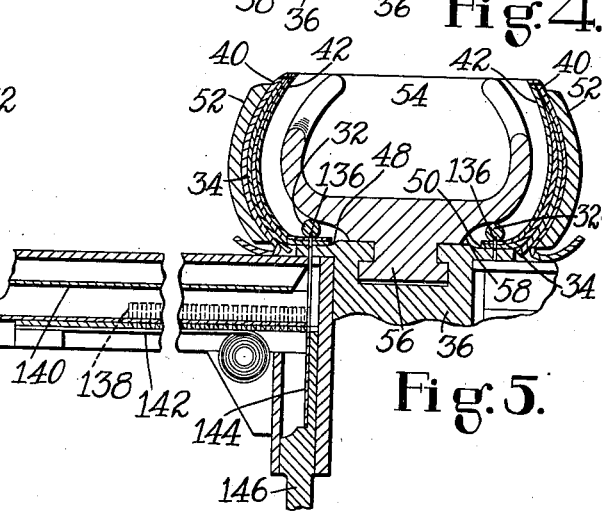
Fig.5.
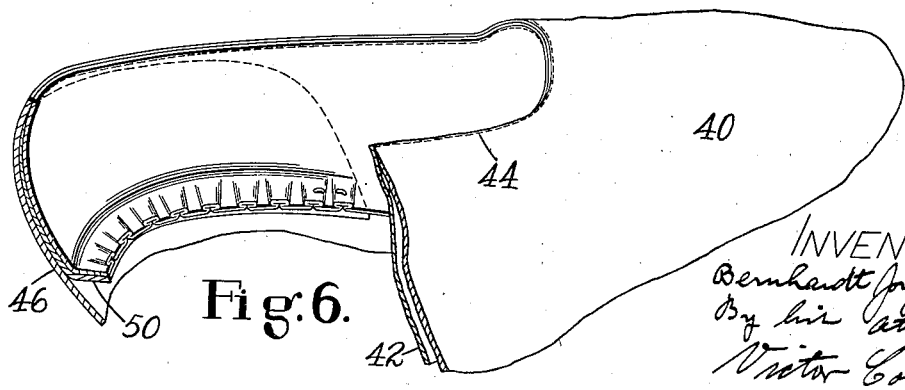
Fig.6.
INVENTOR
Bernhardt Jorgensen
By his attorney
Victor Cobb Patented Aug. 30, 1938

2,128,301

UNITED STATES PATENT OFFICE 2,128,301

METHOD OF ASSEMBLING SHOE UPPERS AND COUNTERS

Bernhardt Jorgensen, Marblehead, Mass., assignor to United Shoe Machinery Corporation, Paterson, N. J., a corporation of New Jersey Original application March 11, 1937, Serial No. 130,340. Divided and this application October 28, 1937, Serial No. 171,525

8 Claims. (Cl. 12—146)

The present invention relates to methods of assembling lined uppers and counters and is herein illustrated in its application to the assembling of lined uppers and molded counters provided with sole-attaching flanges. This application is a division of my copending application Serial No. 130,340, filed March 11, 1937.

The accurate positioning of the counter between the lining and upper at the rear portion of a shoe preliminary to the lasting operations is important, whatever type of counter is used, and is extremely important when molded counters are used since it is practically impossible to alter permanently the shape of a molded counter after it has been inserted into an upper and consequently if it is not accurately assembled in the upper the rear part of the upper will not retain the shape of the last after it is removed therefrom.

It is an object of the present invention to provide a method whereby lined uppers and counters are accurately positioned relatively to each other and permanently secured together. It is a further object of the invention to provide a method whereby the rear part of the upper lining is laid smoothly against the inner surface of the counter and the occurrence of unsightly wrinkles is obviated.

With the above objects in view the invention comprises supporting a lined upper which has not been mounted on its last, supporting a counter within the upper, and wiping the lining at the rear part of the upper from the top edge of the upper heightwise thereof, the lining being turned inside out and arranged to extend outwardly from the upper in order that the lining will partially embrace the wiping element during the wiping operation and enable the wiping element to apply sufficient tension to the lining to insure a smooth application of the lining to the counter.

The invention in another aspect thereof comprises a method of assembling lined uppers and counters which includes positioning a lined upper and a counter with the lining at the rear part of the upper turned inside out and arranged to extend outwardly from the upper, wiping the lining against the inner surface of the counter from the top of the counter to the bottom edge thereof and during the wiping operation causing the non-wiped portion of the lining to extend from the wiping means in a direction substantially opposite to the direction of operative movement of the wiper.

In another aspect the invention comprises a method of assembling lined uppers and counters wherein a lined upper is supported off the last and a counter is supported within the upper in predetermined relation thereto, said method being characterized by the wiping of the quarter lining of the upper from the top edge of the upper heightwise thereof against the inner surface of a counter which has a coating of cement thereon to effect attachment of the lining thereto, and being further characterized by the fact that the outer surface of the counter is left free of cement in order that there will be no attachment of the upper to the counter.

The various aspects of the invention will appear more fully from the following description when read in connection with the accompanying drawing and will be pointed out in the appended claims.

In the drawing,

Fig. 1 is a cross-sectional view taken through the rear portion of a lined upper and a counter which are mounted on suitable supports for the assembling operation and illustrates also a device for wiping the lining downwardly against the inner surface of the counter;

Figs. 2, 3 and 4 are sectional views similar to Fig. 1 illustrating different stages of the assembling operation;

Fig. 5 is a sectional view similar to Fig. 4 illustrating mechanism for fastening together the counter and lining; and Fig. 6 is a perspective view of an upper in which a counter has been assembled, part of the rear portion of the upper being broken away.

In practicing the method of the present invention I prefer to support a lined upper, such as that illustrated in Fig. 1, in upright position upon a support such, for example, as the plate 34 illustrated in Fig. 1, which plate has the general shape of the rear part of a shoe and is mounted in a fixture 36. The plate 34 supports the upper by engagement with the inner surfaces of the upper and lining 42 in the region of the top seam 44 which secures together the upper and the lining. After the upper has been mounted on the plate 34 the lining at the rear part of the upper is turned inside out and arranged to extend upwardly from the upper as illustrated in Fig. 1. A molded counter such, for example, as the counter 46 illustrated in Fig. 1, is then positioned within the supported upper and its outer surface is brought into engagement with the inner surface of the plate 34 and its flange 50 is seated in a rabbeted portion 48 of the fixture 36. A rear-part embracing member 52 is then brought into engagement with the rear part of the upper to hold the upper against displacement on the supporting plate 34 and to provide an abutment to take the pressure applied to the counter during the downwiping of the lining against it. For downwiping the lining I prefer to employ a wiper member such, for example, as wiper rods 32 (Fig. 1) which are stiff enough to resist any considerable bending during the wiping operation but are provided with a flexible connection 62 to permit the wiper to expand and contract as required by the wiping operation.

In order that there will be sufficient resistance of the lining to the downwiping thereof to insure a smooth application of the lining to the inner surface of the counter, an inner form, for example the form 54 illustrated in Fig. 1, is arranged to engage the counter attaching surface of the lining during the operation of the wiper. The illustrated inner form 54 has a T-shaped tongue 56 which is mounted for sliding movement in an undercut groove provided in the fixture 36 and arranged to extend generally lengthwise of the upper. This construction permits the inner form to be moved forwardly from its operating position to facilitate the positioning of the counter within the plate 34. The construction of the form 54 is such that the wiper 32 may move downwardly through the space between the outer surface of the form and the inner surface of the supported counter with a thickness of lining material at each side of the wiper, as illustrated in Fig. 3. Preferably the outer surface of the form is close enough to the counter to cause a frictional engagement of the non-wiped portion of the lining, for example the upturned portion 60 illustrated in Fig. 3, with the outer surface of the form thereby to create sufficient resistance to the downwiping of the lining to insure a tensioning of the lining during the downwiping operation sufficient to cause the lining to be laid smoothly against the counter. As the wiper bar 32 moves downwardly between the form 54 and the counter, the surface of the lining which is exposed in the finished shoe slides about the bottom portion of the wiper bar and creates further resistance to the wiping operation and consequently a relatively small amount of friction between the lining and the form 54 is sufficient to provide the required tension of the lining for the downward wiping operation. In most classes of work a satisfactory lining wiping operation would be performed if the form 54 merely held the lining in wiper-embracing position, as illustrated in Fig. 3, without itself exerting any appreciable frictional action on the lining.

After the wiper 32 comes to the limit of its downwiping movement as shown in Fig. 4 it is contracted and moved forwardly of the shoe to wipe the margin of the lining against the flange of the counter. The inner form 54 is provided with a bottom recess 58 to provide clearance for the final movement of the wiper 32 to wipe the margin of the lining against the flange of the counter.

Preferably the forward portions of the counter flange are fastened to the margin of the lining after the wiping of the lining against the counter has been completed. For inserting staples through the lining and upper to secure them together there is illustrated in Fig. 5 staple inserting mechanism which comprises a magazine 140 which receives a strip of preformed staples 138 which is fed through the magazine by a spring-energized flexible band 142 to position the end staple of the strip to be sheared from the strip and driven by a driving plate 144 secured to a plunger 146. If the wiper 32 is mechanically operated, as in the machine of my copending application hereinbefore referred to, it may serve as an anvil for clenching the staples against the margin of the lining, in which case the wiper is provided with lengthwise grooves 136 (Fig. 5) for the reception of the legs of the staple. It will be understood that if desired the lining and the counter may be stapled together after the upper is removed from the assembling device.

The inner surface of the counter and the upper surface of the counter flange are treated with cement prior to the downwiping of the lining against the counter but the outer surface of the counter is not so treated but is left dry in order that there will be no attachment of the upper to the outer surface of the counter. This leaves the upper free to be positioned relatively to the counter during the pulling-over operation and the subsequent lasting operations without breaking a bond previously formed between the upper and counter. It will be understood that the upper and counter may be cemented together at a later stage in the shoemaking operation if desired.

While I prefer to practice the method of the present invention with the aid of a machine such as that illustrated in my copending application above referred to, it is to be understood that the invention may be practiced without the aid of machinery if so desired. For example, a lining wiper member such as the wiper 32 could be operated as a hand tool and the staples which secure the counter and lining together could be driven by a manually operated stapling device such as that illustrated in United States Letters Patent No. 1,441,683, granted January 9, 1923 on an application of Holzhausen or by any other suitable means.

Having thus described my invention and suitable means for practicing the same, what I claim as new and desire to secure by Letters Patent of the United States is:

1. That improvement in methods of assembling lined uppers and counters which comprises supporting a lined upper off the last, supporting a counter within the upper, and wiping the lining at the rear part of the upper from the top edge of the upper heightwise thereof, the inner surface of the counter being provided with a coating of cement to effect attachment of the lining thereto while the outer surface of the counter is left free of cement in order that there will be no attachment of the upper to the outer surface of the counter.

2. That improvement in methods of assembling lined upper and counters which comprises supporting a lined upper off the last, supporting a counter within the upper, gripping the rear part of the upper thereby to hold it against movement heightwise thereof, wiping the lining at the rear part of the upper from the top edge of the upper heightwise thereof, and cementing the lining to the inner surface of the counter while leaving the upper unattached to the outer surface of the counter.

3. That improvement in methods of assembling lined uppers and counters which comprises supporting a lined upper off the last, supporting a counter within the upper in predetermined relation thereto, wiping the lining at the rear part of the upper from the top edge of the upper heightwise thereof toward the lower edge of the counter, and inserting fastenings through the bottom margins of the counter and the lining thereby to hold said parts in assembled position.

4. That improvement in methods of assembling lined uppers and counters which comprises supporting a lined upper off the last, supporting a counter within the upper in predetermined relation thereto, wiping the lining at the rear part of the upper from the top edge of the upper heightwise thereof toward the lower edge of the counter, and inserting fastenings through the bottom margins of the counter and the lining thereby to hold said parts in assembled position, the inner surface of the counter being provided with a coating of cement to effect attachment of the lining thereto while the outer surface of the counter is left free of cement in order that there will be no attachment of the upper to the outer surface of the counter.

5. That method of assembling lined uppers and counters which comprises relatively positioning a lined upper and a counter with the lining at the rear part of the upper turned inside out and arranged to extend outwardly from the upper, wiping the lining against the inner surface of the counter, and during the wiping operation causing the non-wiped portion of the lining to extend from the wiping means in a direction substantially opposite to the direction of operative movement of the wiping means.

6. That method of assembling lined uppers and counters which comprises relatively positioning a lined upper and a counter with the lining at the rear part of the upper extending away from the upper, wiping the lining against the inner surface of the counter from the top edge of the counter to the bottom edge thereof, during the wiping operation causing the unwiped portion of the lining to extend from the wiping means in a direction opposite to the direction of operative movement of the wiping means, and frictionally engaging the unwiped portion of the lining during the wiping operation thereby to create resistance to said wiping operation.

7. That method of assembling lined uppers and counters which comprises relatively positioning a lined upper and a counter with the lining extending upwardly from the top edge of the upper, wiping the lining against the inner surface of the counter from its top edge to its bottom edge, and causing the lining to embrace the wiping means during the said wiping operation.

8. That method of assembling lined uppers and flanged counters which comprises relatively positioning a lined upper and a flanged counter with the rear part of the lining turned inside out and arranged to extend away from the top edge of the upper, wiping the lining against the inner surface of the counter from the top edge of the counter to the counter flange, applying friction to the non-wiped portion of the lining during the wiping operation thereby to create a resistance to said operation, and wiping the bottom margin of the lining from the body portion of the counter to the edge of the counter flange.

BERNHARDT JORGENSEN.